United States Patent
Li et al.

(10) Patent No.: US 12,442,165 B2
(45) Date of Patent: Oct. 14, 2025

(54) PLASTIC INTEGRATED ANTI-SCALD DEVICE

(71) Applicant: AS America, Inc., Piscataway, NJ (US)

(72) Inventors: Hsiao Chang Li, Edison, NJ (US); Jesus Garcia, Monterrey (MX); Enrique Gonzalez-Corona, Garcia (MX); Victor Loredo, Apodaca (MX); Jose David Hernandez, Escobedo (MX)

(73) Assignee: AS America, Inc., Piscataway, NJ (US)

( * ) Notice: Subject to any disclaimer, the term of this patent is extended or adjusted under 35 U.S.C. 154(b) by 0 days.

(21) Appl. No.: 18/577,117

(22) PCT Filed: Jul. 19, 2022

(86) PCT No.: PCT/US2022/073902
§ 371 (c)(1),
(2) Date: Jan. 5, 2024

(87) PCT Pub. No.: WO2023/004325
PCT Pub. Date: Jan. 26, 2023

(65) Prior Publication Data
US 2024/0209603 A1    Jun. 27, 2024

Related U.S. Application Data

(60) Provisional application No. 63/223,727, filed on Jul. 20, 2021.

(51) Int. Cl.
*G05D 23/13*    (2006.01)
*E03C 1/04*    (2006.01)
*G05D 23/02*    (2006.01)

(52) U.S. Cl.
CPC .......... *E03C 1/041* (2013.01); *G05D 23/022* (2013.01); *G05D 23/134* (2013.01)

(58) Field of Classification Search
CPC .... F16K 31/002; G05D 23/02; G05D 23/021; G05D 23/022; G05D 23/13;
(Continued)

(56) References Cited

U.S. PATENT DOCUMENTS 2,235,651 A    3/1941    Frank
3,921,659 A    11/1975    Rudewick, III
(Continued)

FOREIGN PATENT DOCUMENTS

CH    633625 A5    12/1982
CN    101568756 A    10/2009
(Continued)

OTHER PUBLICATIONS

American Standard (2016). "NextGen Selectronic Commercial Faucets—American Standard", located at https://www.youtube.com/watch?v=o14oNQPZGyw; 3 pages.
(Continued)

*Primary Examiner* — Jonathan Bradford
(74) *Attorney, Agent, or Firm* — Morrison & Foerster LLP

(57) ABSTRACT

Provided are anti-scald assemblies for a faucet housing having a polymeric manifold housing with an anti-scald cavity housing an anti-scald device, a mixing cavity housing a mixing valve, and an actuator cavity housing an actuating member. A longitudinal axis of the anti-scald cavity is at an angle between 0 and 90 degrees relative to a longitudinal axis of the actuator cavity. The anti-scald device comprises a thermal actuator coupled to a plunger, and the thermal actuator and the plunger are held in an open position within the anti-scald cavity with a bias spring. When the temperature of the mixed water reaches a pre-set temperature in the sensing region of the anti-scald cavity, the thermal actuator is configured to expand such that the thermal actuator moves (Continued)

the plunger of the anti-scald device along the longitudinal axis of the anti-scald cavity to a closed position to close off the hot water inlet.

19 Claims, 12 Drawing Sheets

(58) Field of Classification Search
CPC ............. G05D 23/1306; G05D 23/132; G05D 23/1326; G05D 23/134; G05D 23/1346; G05D 23/1353
See application file for complete search history.

(56) References Cited

U.S. PATENT DOCUMENTS

| | | | |
|---|---|---|---|
| 5,011,074 | A | 4/1991 | Kline |
| 5,141,153 | A | 8/1992 | Jeffress |
| 5,647,530 | A | 7/1997 | Lorch |
| 6,003,170 | A | 12/1999 | Humpert et al. |
| 6,042,015 | A | 3/2000 | Eveleigh et al. |
| 10,088,851 | B2 | 10/2018 | Huck et al. |
| 10,119,253 | B2 | 11/2018 | Seggio et al. |
| 10,590,635 | B2 | 3/2020 | Fassolette |
| 2003/0234295 | A1 | 12/2003 | Mace |
| 2007/0000547 | A1 | 1/2007 | Cochart et al. |
| 2009/0044865 | A1 | 2/2009 | Migliore et al. |
| 2013/0062422 | A1* | 3/2013 | Marty .................... E03C 1/057 236/12.16 |
| 2014/0261781 | A1 | 9/2014 | Dolgos |
| 2017/0328041 | A1 | 11/2017 | Seggio et al. |
| 2019/0177956 | A1 | 6/2019 | Seggio et al. |
| 2022/0195708 | A1 | 6/2022 | Seggio et al. |

FOREIGN PATENT DOCUMENTS

| | | |
|---|---|---|
| CN | 201934726 U | 8/2011 |
| CN | 201944335 U | 8/2011 |
| CN | 103511667 A | 1/2014 |
| CN | 205155161 U | 4/2016 |
| DE | 2917233 A1 | 11/1979 |
| DE | 2917233 C2 | 9/1988 |
| EP | 0461562 A2 | 12/1991 |
| JP | 2006-144322 A | 6/2006 |
| WO | 03/085474 A1 | 10/2003 |
| WO | 2006/040456 A1 | 4/2006 |

OTHER PUBLICATIONS

Seggio et al., U.S. Office Action dated Mar. 31, 2021, directed to U.S. Appl. No. 16/181,076; 10 pages.

Seggio et al., U.S. Office Action dated Apr. 23, 2020, directed to U.S. Appl. No. 16/181,076; 9 pages.

Seggio et al., U.S. Office Action dated Feb. 23, 2023, directed to U.S. Appl. No. 17/690,939; 13 pages.

Seggio et al., U.S. Office Action dated Feb. 7, 2020, directed to U.S. Appl. No. 16/181,076; 9 pages.

Seggio et al., U.S. Office Action dated Jul. 22, 2019, directed to U.S. Appl. No. 16/181,076; 9 pages.

Seggio et al., U.S. Office Action dated Nov. 10, 2020, directed to U.S. Appl. No. 16/181,076; 9 pages.

Seggio et al., U.S. Office Action dated Feb. 12, 2018, directed to U.S. Appl. No. 15/153,818; 10 pages.

* cited by examiner

PLASTIC INTEGRATED ANTI-SCALD DEVICE

CROSS-REFERENCE TO RELATED APPLICATIONS

This application is a U.S. national stage application under 35 U.S.C. § 371 of International Application No. PCT/US2022/073902, filed Jul. 19, 2022, which claims the benefit of U.S. Provisional Application No. 63/223,727, filed Jul. 20, 2021. The entire contents of each priority application is incorporated herein by reference.

FIELD

The present disclosure generally relates to fluid supply assemblies, and more particularly, to faucet assemblies (e.g., electrically or mechanically actuated faucet assemblies) having a plastic integrated anti-scald device.

BACKGROUND

Conventional faucet assemblies do not have any control for preventing unsafe hot water temperatures being delivered to a user of the faucet assembly. Thus, a user of a conventional faucet assembly may, when manipulating a temperature control of the faucet assembly (e.g., a handle or knob) to receive hot water, may receive excessively hot water. Excessively hot water can cause a scald injury to the user.

Accordingly, anti-scald devices may be connected to a conventional faucet to control the maximum temperature of the water flowing out of and to the user. Anti-scald devices are generally after-market devices that can connect to a faucet assembly and can reduce or stop the flow of water when the mixed water temperature exceed a certain threshold. For example, it may be desired for plumbing fixtures that are used predominantly by children or elderly people to have an anti-scald device to prevent injuries. A user can install an anti-scald device to control the water temperature of their faucet assembly.

SUMMARY

Provided herein are faucet assemblies having an integrated anti-scald devices and related features, systems, and methods of use. Specifically, provided herein are faucet assemblies having a plastic anti-scald device that is configured to reduce or stop water from exiting the faucet assembly when the temperature of the mixed water in the mixing cavity of the faucet assembly reaches or exceeds a predetermined threshold. In some embodiments, the predetermined water temperature threshold may be user-adjustable. When implemented, the exemplary faucet assembly can prevent scalding as defined by American Society of Sanitary Engineering ("ASSE") 1070.

As described above, conventional faucet assemblies do not include any form of temperature control to prevent hot water or scald injuries. Such a safety measure may be particularly desirable for faucet assemblies that are frequently used by children or elderly people, for example. The faucet assemblies having a plastic integrated anti-scald device according to embodiments described herein may reduce (i) the number of components required, (ii) the installation space required, and/or (iii) the additional associated installation costs of adding a separate anti-scald device for a faucet.

Further, the integrated anti-scald device described herein comprises a plastic manifold. The plastic manifold can reduce the amount of heat transfer from the hot water in the device to the manifold, increasing the efficiency of faucet assembly. This reduction in heat transfer can also allow the anti-scald device to "reset" more quickly after it is activated by mixed water having a temperature at or above a pre-set temperature.

The anti-scald devices of the present disclosure (e.g., with the integrated mixing valve, positioned within a faucet assembly) can be used in a variety of plumbing fixtures (e.g., lavatory faucet assembly, kitchen faucet assembly, sink faucet assembly, etc.). For example, a faucet assembly comprising an integrated anti-scald device according to some embodiments can take the form of a hands-free electronic sensor actuated faucet assembly (e.g., for use as a lavatory, kitchen or sink faucet assembly, etc.).

In some embodiments, provided is an anti-scald assembly for a faucet housing, the anti-scald assembly comprising: a polymeric manifold housing comprising an anti-scald cavity, a mixing cavity, a hot water inlet, a cold water inlet, a mixed water outlet, and an actuator cavity housing an actuating member, wherein a longitudinal axis of the anti-scald cavity is at an angle from about 5 to about 85 degrees relative to a longitudinal axis of the actuator cavity; an anti-scald device housed within the anti-scald cavity of the polymeric manifold housing, the anti-scald device comprising a thermal actuator coupled to a plunger, wherein the thermal actuator and the plunger are held in an open position within the anti-scald cavity with a bias spring, wherein, when actuating member is actuated, mixed water from the mixing cavity is configured to flow to a sensing region of the anti-scald cavity and to the mixed water outlet, the mixed water being formed by cold water that is configured to flow from the cold water inlet to the mixing cavity and hot water that is configured to flow from the hot water inlet to the mixing cavity, and wherein, when a temperature of the mixed water reaches or exceeds a pre-set temperature in the sensing region of the anti-scald cavity, the thermal actuator is configured to expand such that the thermal actuator moves the plunger of the anti-scald device along the longitudinal axis of the anti-scald cavity to a closed position to close off the hot water inlet.

In some embodiments of the anti-scald assembly, the longitudinal axis of the actuator cavity is vertical.

In some embodiments of the anti-scald assembly, the longitudinal axis of the anti-scald cavity is from about 30 to about 60 degrees relative to the longitudinal axis of the actuator cavity.

In some embodiments of the anti-scald assembly, the longitudinal axis of the actuator cavity is parallel to a direction at which cold water enters the cold water inlet from a cold water supply and to a direction at which hot water enters the hot water inlet from a hot water supply.

In some embodiments of the anti-scald assembly, a portion of the anti-scald cavity is directly below a portion of the mixing cavity.

In some embodiments of the anti-scald assembly, the polymeric manifold housing comprises one or more of a polyphthalamide, a polyamide, a polyester, a polyolefin, a polycarbonate, a polyphenylene sulfide, a polyoxymethylene, or a polystyrene.

In some embodiments of the anti-scald assembly, the thermal actuator comprises a wax element.

In some embodiments of the anti-scald assembly, the plunger surrounds a distal end of the thermal actuator.

In some embodiments of the anti-scald assembly, the mixing cavity houses a mixing valve.

In some embodiments of the anti-scald assembly, the mixing valve is a dual-cam mixing valve comprising a cold water portion and a hot water portion, the hot water portion comprising a first recessed end and a first elevated end and the cold water portion comprising a second recessed end and a second elevated end.

In some embodiments of the anti-scald assembly, the coupled dual-cam mixing valve is configured to be movable between a full-cold position and a full-hot position to simultaneously adjust flow of both the hot water and the cold water into the mixing cavity.

In some embodiments of the anti-scald assembly, the coupled dual-cam mixing valve is configured such that, when the coupled dual-cam mixing valve is in the full-cold position, the second elevated end is positioned a first distance from an end of the cold water inlet such that a first amount of cold water flows into the mixing cavity.

In some embodiments of the anti-scald assembly, the coupled dual-cam mixing valve is configured such that, when the coupled dual-cam mixing valve is in the full-hot position, the second elevated end is positioned a second distance, less than the first distance, from the end of the cold water inlet such that a second amount of cold water, less than the first amount, flows into the mixing cavity.

In some embodiments of the anti-scald assembly, the hot water inlet is fluidly connected to the mixing cavity and the cold water inlet is fluidly connected to the mixing cavity, and wherein the mixing cavity is fluidly connected to a sensing region of the anti-scald cavity such that a mixed water flow formed from hot water and cold water travels through the sensing region of the anti-scald cavity and then out the mixed water outlet.

In some embodiments of the anti-scald assembly, the thermal actuator is configured such that, after the hot water inlet is closed by the plunger, cold water continues to flow to the sensing region.

In some embodiments of the anti-scald assembly, when the anti-scald assembly is installed in a faucet housing, a sensor of the faucet housing is configured to control the actuator.

In some embodiments of the anti-scald assembly, the sensor comprises an infrared sensor, a proximity sensor, a capacitive sensor, a microwave sensor, or an ultrasonic sensor.

In some embodiments, provided is a fluid supply assembly, the fluid supply assembly comprising: a faucet housing comprising a spout opening, a base adaptor, and an outlet conduit; a polymeric manifold housing housed within the faucet housing and mounted to the base adaptor of the faucet housing, the polymeric manifold housing comprising an anti-scald cavity, a mixing cavity, a hot water inlet, a cold water inlet, a mixed water outlet, and an actuator cavity housing an actuating member, wherein a longitudinal axis of the anti-scald cavity is at an angle from about 5 to about 85 degrees relative to a longitudinal axis of the actuator cavity; an anti-scald device housed within the anti-scald cavity of the polymeric manifold housing, the anti-scald device comprising a thermal actuator coupled to a plunger, wherein the thermal actuator and the plunger are held in an open position within the anti-scald cavity with a bias spring, wherein, when actuating member is actuated, mixed water from the mixing cavity is configured to flow to a sensing region of the anti-scald cavity and to the mixed water outlet, the mixed water being formed by cold water that is configured to flow from the cold water inlet to the mixing cavity and hot water that is configured to flow from the hot water inlet to the mixing cavity, wherein, when a temperature of the mixed water reaches or exceeds a pre-set temperature in the sensing region of the anti-scald cavity, the thermal actuator is configured to expand such that the thermal actuator moves the plunger of the anti-scald device along the longitudinal axis of the anti-scald cavity to a closed position to close off the hot water inlet.

In some embodiments of the fluid supply assembly, the mixed water outlet of the polymeric manifold housing is coupled to a first end of an adaptor, and a second end of the adaptor is coupled to the outlet conduit of the faucet housing such that the adaptor fluidly couples the mixed water outlet of the manifold housing to the outlet conduit of the faucet housing.

In some embodiments of the fluid supply assembly, the longitudinal axis of the actuator cavity is vertical.

In some embodiments of the fluid supply assembly, the longitudinal axis of the anti-scald cavity is from about 30 to about 60 degrees to the longitudinal axis of the actuator cavity.

In some embodiments of the fluid supply assembly, the longitudinal axis of the actuating cavity is parallel to a direction at which cold water enters the cold water inlet from a cold water supply and to a direction at which hot water enters the hot water inlet from a hot water supply.

In some embodiments of the fluid supply assembly, a portion of the anti-scald cavity is directly below a portion of the mixing cavity.

In some embodiments of the fluid supply assembly, the polymeric manifold housing comprises one or more of a polyphthalamide, a polyamide, a polyester, a polyolefin, a polycarbonate, a polyphenylene sulfide, a polyoxymethylene, or a polystyrene.

In some embodiments of the fluid supply assembly, the thermal actuator comprises a wax element.

In some embodiments of the fluid supply assembly, the plunger surrounds a distal end of the thermal actuator.

In some embodiments of the fluid supply assembly, the mixing cavity houses a mixing valve.

In some embodiments of the fluid supply assembly, the mixing valve is a dual-cam mixing valve comprising a cold water portion and a hot water portion, the hot water portion comprising a first recessed end and a first elevated and the cold cam portion comprising a second recessed end and a second elevated end.

In some embodiments of the fluid supply assembly, the coupled dual-cam mixing valve is configured to be movable between a full-cold position and a full-hot position to simultaneously adjust flow of both the hot water and the cold water into the mixing cavity.

In some embodiments of the fluid supply assembly, the coupled dual-cam mixing valve is configured such that, when the coupled dual-cam mixing valve is in the full-cold position, the second elevated end is positioned a first distance from an end of the cold water inlet such that a first amount of cold water flows into the mixing cavity.

In some embodiments of the fluid supply assembly, the coupled dual-cam mixing valve is configured such that, when the coupled dual-cam mixing valve is in the full-hot position, the second elevated end is positioned a second distance, less than the first distance, from the end of the cold water inlet such that a second amount of cold water, less than the first amount, flows into the mixing cavity.

In some embodiments of the fluid supply assembly, the hot water inlet is fluidly connected to the mixing cavity and the cold water inlet is fluidly connected to the mixing cavity, and wherein the mixing cavity is fluidly connected to a sensing region of the anti-scald cavity such that a mixed water flow formed from hot water and cold water travels through the sensing region of the anti-scald cavity and then out the mixed water outlet.

In some embodiments of the fluid supply assembly, the thermal actuator is configured such that, after the hot water inlet is closed by the plunger, cold water continues to flow to the sensing region.

In some embodiments of the fluid supply assembly, the fluid supply assembly comprises a sensor configured to control the actuator.

In some embodiments of the fluid supply assembly, the sensor comprises an infrared sensor, a proximity sensor, a capacitive sensor, a microwave sensor, or an ultrasonic sensor.

In some embodiments, any one or more of the features, characteristics, or elements discussed above with respect to any of the embodiments may be incorporated into any of the other embodiments mentioned above or described elsewhere herein.

DETAILED DESCRIPTION

Figure 1:
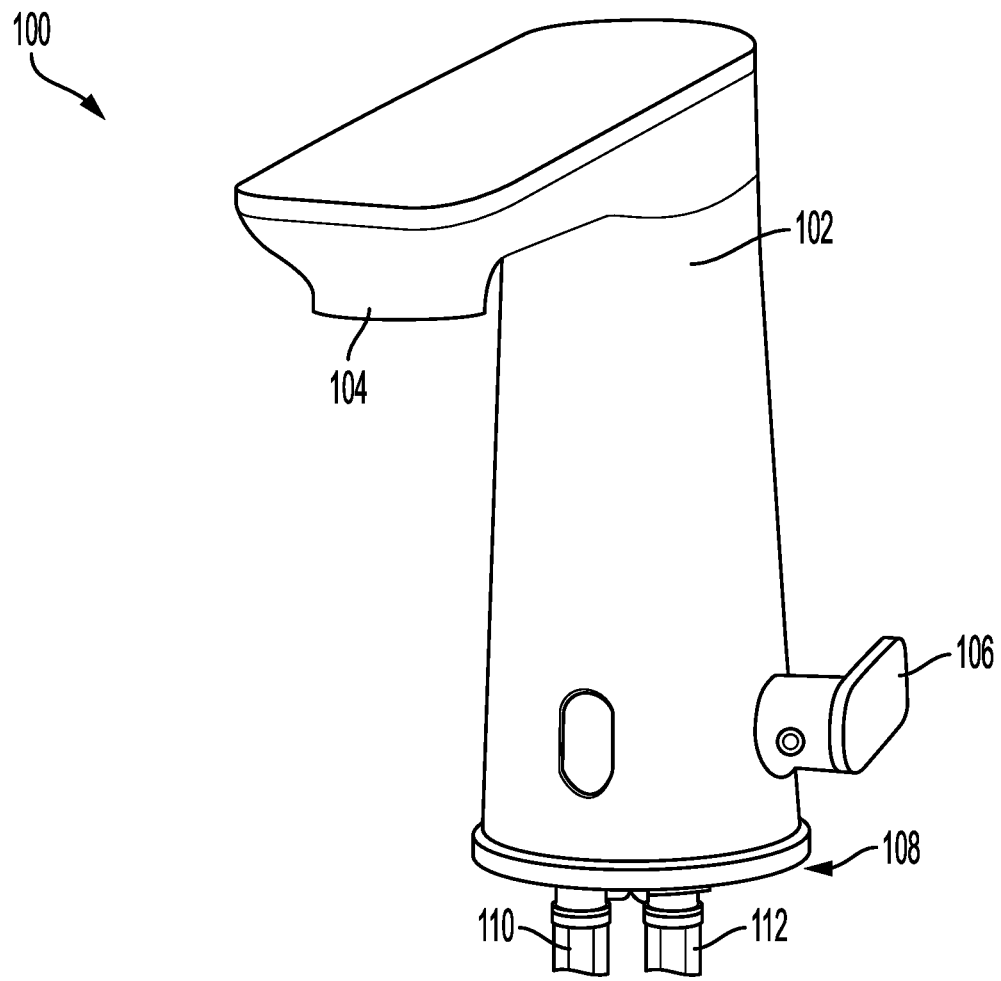
FIG. 1 shows a plumbing fixture suitable for an integrated anti-scald device, according to some embodiments.

Described herein are anti-scald devices and faucet assemblies comprising an integrated anti-scald device. The anti-scald devices and faucet assemblies comprising integrated anti-scald devices may reduce or stop the outlet flow of water in the event that the water reaches or exceeds a predetermined or pre-set temperature. By reducing or stopping the flow of water in such cases, the risk of a scalding injury may be minimized. Accordingly, the faucet assemblies comprising an integrated anti-scald device as well as the individual integrated anti-scald devices (with a mixing valve) provide improved fluid supply assemblies for fluid systems.

In some embodiments, the anti-scald devices provided herein may be provided within a faucet assembly (i.e., a faucet assembly comprising an integrated anti-scald device) such that the faucet assembly may be packaged and purchased together with the anti-scald device. Alternatively, the anti-scald device may be provided on its own, as an aftermarket or replacement part for a faucet assembly.

The faucet assemblies of the present disclosure can eliminate the need for a separate anti-scald device, thereby advantageously reducing the number of components required and/or reducing the installation costs/space required. Further, the integrated anti-scald devices provided herein are configured to minimize the overall dimensions of the device. Specifically, the longitudinal axis of the anti-scald cavity of the manifold housing is disposed at an angle of between 5 and 85 degrees to the longitudinal axis of the actuator cavity of the manifold housing. The longitudinal axis of the anti-scald cavity of the manifold housing is also disposed at an angle of between 5 and 85 degrees with respect to the direct at which cold water and hot water enters the manifold housing (i.e., from the hot water supply line to the hot water inlet, and from the cold water supply line to the cold water inlet). This angled anti-scald cavity can form a more compact manifold with integrated anti-scald device. A more compact manifold means that it can be compatible with more sizes, shapes, and designs of faucet housings.

In some embodiments, a portion of the mixing cavity of the manifold housing is above the anti-scald cavity. In some embodiments, a portion of the actuator cavity is above the anti-scald cavity. With any one or more of these configuration features described, the integrated anti-scald device may be able to be more compact than previous integrated anti-scald devices, allowing the device to be used with smaller faucet assemblies. Further, in some embodiments, the flow path from the actuating member to the sensing region of the anti-scald device is short, allowing the anti-scald device to react more quickly to mixed water having a temperature that is at or above the pre-set temperature. This can provide a more sensitive anti-scald device, minimizing the risk of scald injuries.

In some embodiments, a mixing valve can be configured such that a hot water flow path cannot not be open without a cold water flow path also being open, thereby limiting the maximum temperature of the mixed outlet water flow. As discussed further below, the cold water path can also serve to help reset the integrated anti-scald device.

Faucet assemblies having the integrated mixing valve and having the integrated anti-scald device positioned within the faucet assembly (e.g., mixing valve and anti-scald device positioned within the manifold housing or body of the faucet assembly) can be utilized for a variety of uses (e.g., lavatory faucet assembly, kitchen faucet assembly, sink faucet assembly, etc.). Additionally, the incorporation of an integrated mechanical mixing valve and an integrated anti-scald device positioned within the faucet assembly (e.g., within manifold housing) can advantageously reduce the material cost, installation complexity, the associated installation costs, and/or space requirements compared to some conventional assemblies having separate mixing valves connecting to faucet bodies. The configuration of the component parts of the integrated anti-scald device provided herein may also require reduced space requirements and increased temperature sensitivity relative to previous integrated anti-scald devices. Specifically, the placement of the anti-scald cavity and device within the manifold housing (i.e., at an angle) reduces the diameter and height of the overall device (i.e., defined by the manifold housing), and thus, the overall dimensions and volume of the manifold with integrated anti-scald device. Additionally, because the flow path between the actuating member (which controls flow between the mixing cavity) and the sensing region of the anti-scald cavity is relatively short, this allows the anti-scald device to react more quickly (i.e., close off the hot water inlet flow) when the mixed water temperature reaches or exceeds the pre-set temperature.

Further, the hot water flow can be stopped quickly and completely (not just reduced substantially) if the mixed water temperature exceeds a maximum preset temperature (e.g., complying with ASSE 1070), while still allowing cold water, if available, to flow. This cold water flow can also provide cooling to the anti-scald device (e.g., thermal responsive valve), thereby functioning as a "reset" feature which allows the hot water to quickly again begin flowing and mixing with the cold water flow.

As described herein, the anti-scald device is integrated with the mixing valve of a faucet assembly. Hot water enters the device from a hot water supply line and to a hot water inlet of the device. The hot water then travels to a plunger region of an anti-scald cavity. From there, the hot water travels to a mixing cavity of the manifold.

Cold water flows from a cold water supply line to a cold water inlet of the device. From the cold water inlet, the cold water flows to the mixing cavity, where the cold water mixes with the hot water.

The mixed water then flows from the mixing cavity to a sensing region of the anti-scald cavity, and then out of the manifold housing by way of the mixed fluid outlet. The mixed fluid outlet is in fluid communication with a water outlet of a faucet assembly.

When the mixed water flows to the sensing region, it warms a wax element of a thermal actuator. As the temperature of the mixed water increases, the wax element expands. If the temperature of the mixed water reaches or exceeds a predetermined threshold, it can cause the wax element to expand such that it overcomes the bias force of a bias spring and forces a distal end of the plunger of the anti-scald device to come in contact with a cylindrical seating surface of the plunger region. This contact between the distal end of the plunger and the cylindrical seating surface of the plunger region prevents hot water from entering the plunger region from the hot water inlet. Accordingly, the integrated anti-scald device is designed to reduce or stop the flow of hot water when the temperature of the mixed water reaches or exceeds a predetermined threshold.

Referring now to the drawings, like parts are marked throughout the specification and drawings with the same reference numerals, respectively.

FIG. 1 shows a fluid supply assembly 100 (e.g., faucet assembly 100) according to some embodiments.

As shown in FIG. 1, fluid supply assembly 100 includes a spout housing 102, a spout opening 104, a handle member 106, and a base adapter 108. Fluid supply assembly 100 also includes a hot water supply line 110 and a cold water supply line 112.

Although the fluid supply assembly 100 depicts a generic faucet, it should be recognized that a generic faucet is only one example of a fluid supply assembly that may be suitable for use with the disclosed integrated anti-scald device. More specifically, suitable fluid supply assemblies can include a lavatory faucet assembly, a kitchen faucet assembly, a sink faucet assembly, etc.

Figure 2:
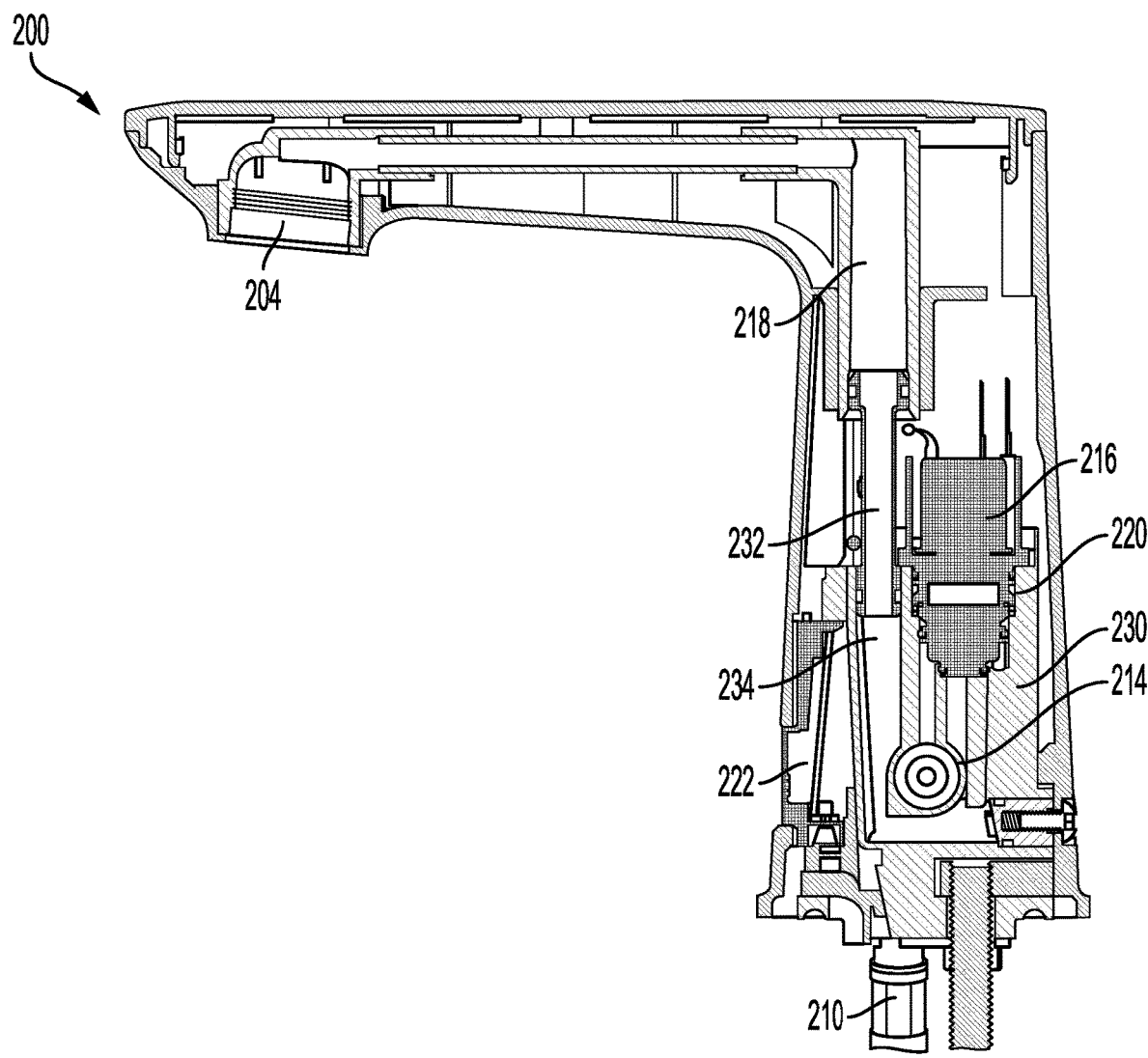
FIG. 2 shows a cross-sectional view of a plumbing fixture comprising an integrated anti-scald device, according to some embodiments.

FIG. 2 shows a cross-sectional view of a fluid supply assembly 200 comprising an integrated anti-scald device, according to some embodiments. As shown, the fluid supply assembly 200 can include a hot water supply line 210, a mixing cavity 214, an actuating member 216, an adapter 232, a mixed water outlet 234, an outlet conduit 218, and a spout opening 204. In some embodiments, fluid supply assembly 200 may be an automatic touch-free/hands-free faucet. For example, a user may control fluid supply assembly 200 via sensor 222. In some embodiments, fluid supply assembly 200 may be a manual system.

The hot water and cold water are mixed in the mixing cavity 214 to form mixed water having a mixed water temperature. The mixed water flows up from the mixing cavity to an actuating member 216. When the actuating member 216 is in an open position, the mixed water is allowed to flow past/through the actuating member 216 and to a sensing chamber of the anti-scald device. From the sensing chamber, the mixed water flows to mixed water outlet 234 and out of manifold housing 230 by way of adaptor 232. A first end of adaptor 232 couples to mixed water outlet 234, and a second end of adaptor 232 couples to outlet conduit 218. From outlet conduit 218, mixed water can flow to spout opening 204 and to a user.

Actuating member 216 is used to control the flow of mixed water from mixing cavity 214 to an outlet of the faucet. The actuation of actuating member 216 (e.g., electrically or mechanically actuated on/off valve member 216). In some embodiments, actuating member 216 may comprise a solenoid valve which is controlled by sensor 222. (In some embodiments, sensor 222 may be an infrared sensor, a proximity sensor, a capacitive sensor, a microwave sensor, or an ultrasonic sensor, or the like.) In some embodiments, actuating member 216 is mounted to manifold housing via actuator cavity 220 (e.g., via threads of member 230 and cavity 220). As shown in FIG. 2, actuating cavity 220 extends vertically and has a longitudinal axis that extends vertically. In some embodiments, a portion of actuating cavity 220 is directly above a portion of mixing cavity 214.

Figure 3:
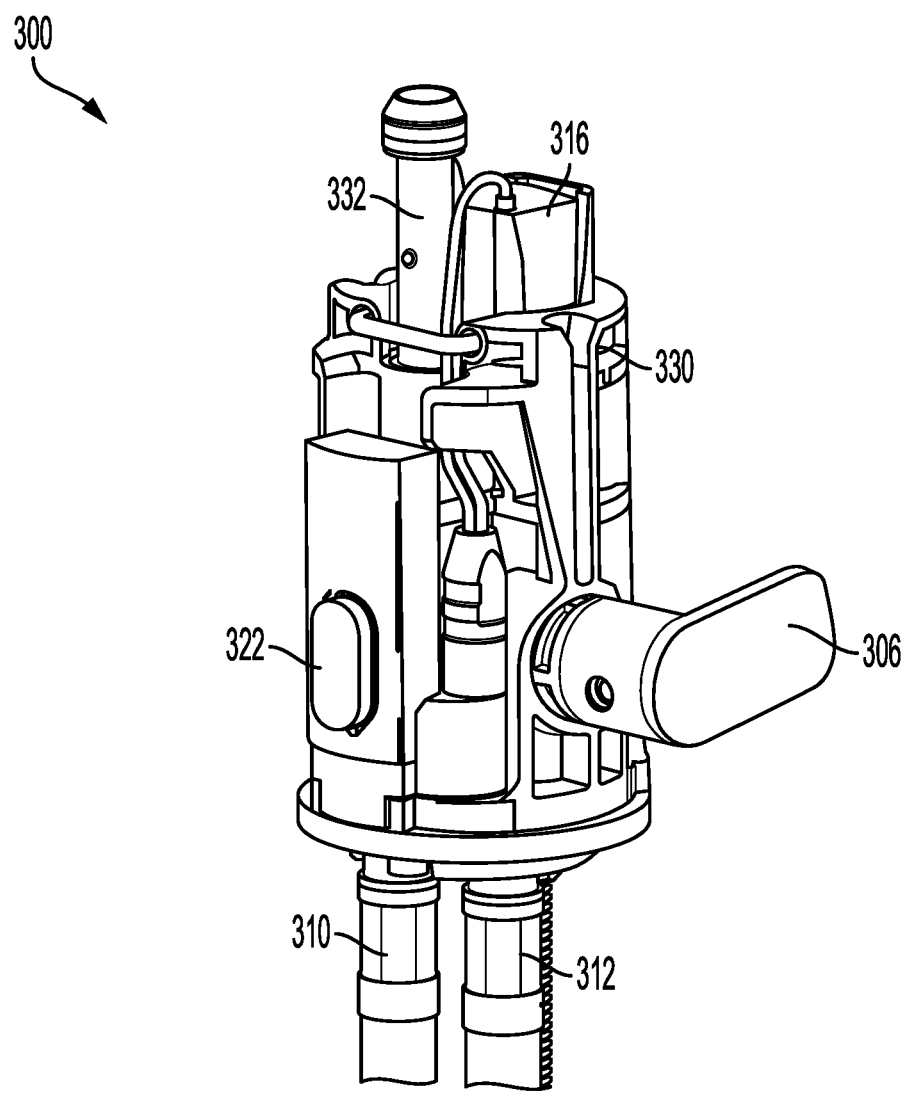
FIG. 3 shows a perspective view of an integrated anti-scald device and mixing valve, according to some embodiments.

FIG. 3 shows a perspective view of a manifold housing having an integrated anti-scald device 300, according to some embodiments. As shown, the manifold housing 330 is coupled to a cold water supply line 312, a hot water supply line 310, an actuating member 316, a handle member 306, a sensor 322, and an adaptor 332.

The manifold housing 330 is formed from a polymer. For example, suitable polymers can include an engineering thermoplastic. Suitable thermoplastic polymers may comprise a polyphthalamide, a polyamide, a polyester, a polyolefin, a polycarbonate, a polyphenylene sulfide, a polyoxymethylene, a polystyrene, combinations thereof, or copolymers thereof. The polymeric manifold housing 330 allows for less heat transfer to occur between the water and the manifold housing 330. For example, if the manifold housing 330 is fabricated of a more thermally conductive material, the water within the device may lose heat to the manifold housing 330. This increased heat transfer from the water to the manifold housing 330 would create a less efficient device. Similarly, a more thermally conductive manifold housing 330 would also slow the resetting process of the anti-scald device (and specifically, the thermal actuator of the anti-scald device). As explained below, if the temperature of the mixed water reaches or exceeds a pre-set temperature, the thermal actuator of the anti-scald device expands to move the plunger of the anti-scald device into a closed position. In a closed position, an o-ring may sit on an abutment surface of the plunger region of the mixing cavity, preventing hot water from flowing from the hot water inlet to the mixing cavity. Once the thermal actuator is expanded to form this closed position, it needs to contract to "reset" and allow hot water to once again enter the mixing cavity. However, a manifold housing 330 made of a thermally conductive material (e.g., metal) would inhibit or slow this contraction of the thermal actuator. Accordingly, a polymeric manifold housing 330 helps form a more efficient water flow device and anti-scald assembly that minimizes heat transfer in various components of the device and at various times during operation.

A plastic or polymeric manifold may be fabricated by molding. For example, plastic or polymeric manifolds described herein may be fabricated by using injection molding. Molded manifolds may be more precise than machined manifolds. For example, some manifolds having vertical or horizontal anti-scald cavities are machined (because they are made of a metal or alloy, for example). These manifolds can be more inconsistent in quality than those that are currently described, which are fabricated using plastic molding techniques.

The hot water supply line 310 is configured to introduce hot water from a hot water supply line to a hot water inlet of the manifold housing 330. The cold water supply line 312 is configured to introduce cold water from a cold water supply line to a cold water inlet of the manifold housing 330.

Actuating member 316 may be actuated by sensor 322. When sensor 322 is activated, the actuating member 316 may move from a closed position to an open position. When sensor 322 is deactivated, the actuating member 316 may move from an open position to a closed position. In some embodiments, handle member 306 is configured to control the mixed water temperature of a faucet assembly. For example, handle member 306 may be configured to releaseably attach to a mixing valve configured to control the amount of cold water and the amount of hot water that enters a mixing cavity of the device. Handle member 306 may be configured to position the mixing valve into a full-hot position, a full-cold position, or anywhere in between.

Once the hot water and cold water have been mixed in the mixing cavity, the water may be transferred to an outlet conduit of a faucet (and out of a faucet opening to a user) by way of adapter 332. Adapter 332 is configured to mount to the mixed water outlet of manifold housing 330 to fluidly connect the mixed water outlet of the manifold housing 330 to the outlet conduit of a faucet housing.

Figure 4A:
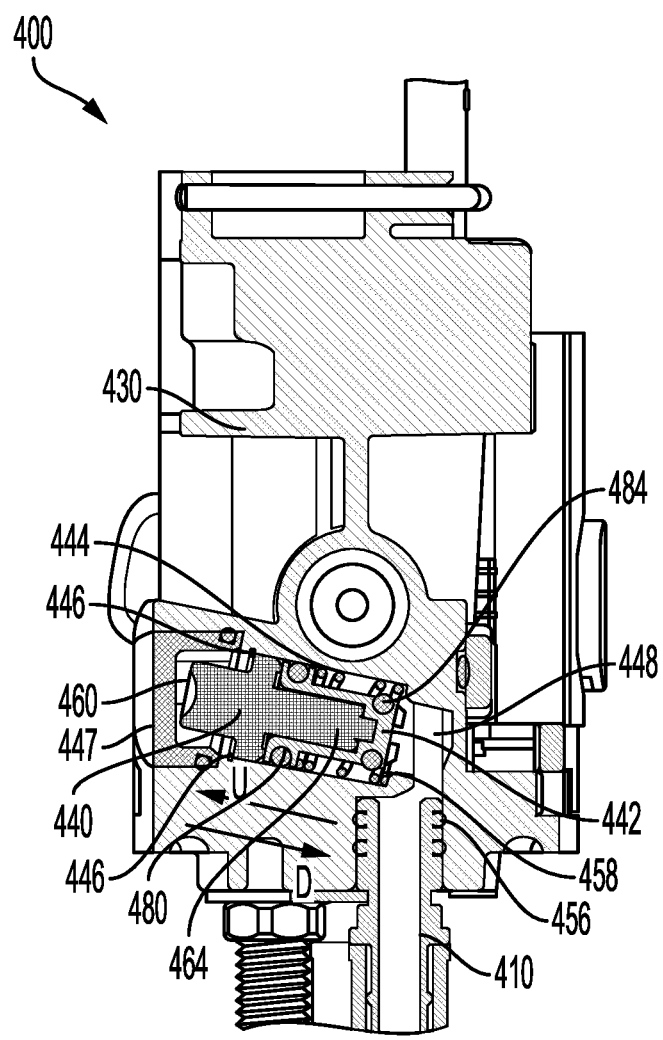
FIGS. 4A-4C show various cross-sectional views of an integrated anti-scald device and mixing valve, according to some embodiments.
Figure 4B:
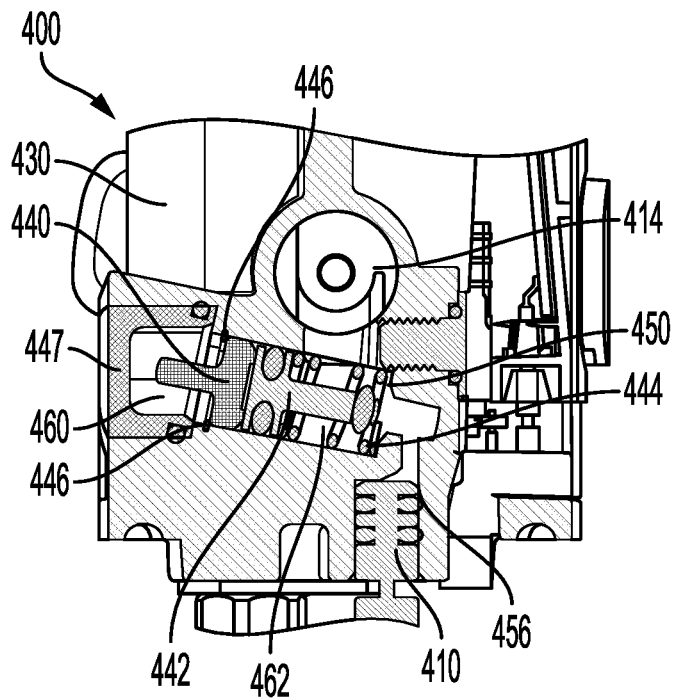
Figure 4C:
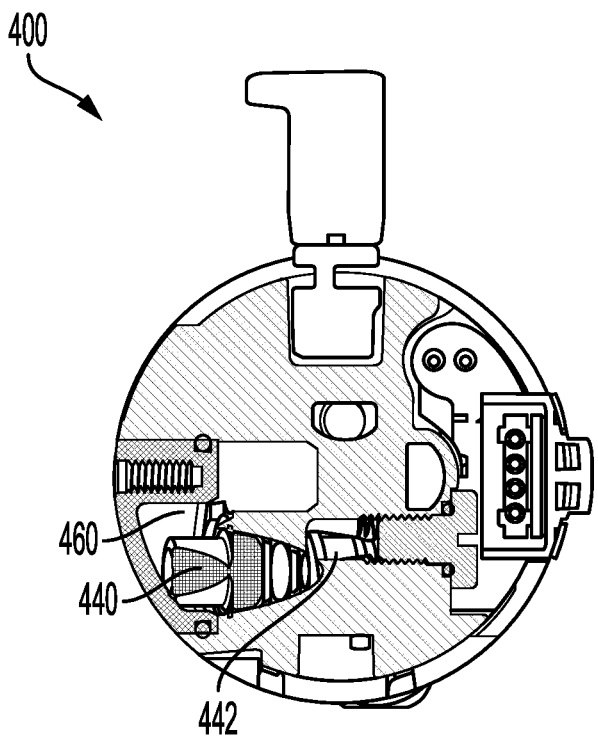

FIGS. 4A, 4B, and 4C show various cross-sectional views of an integrated anti-scald device 400 according to some embodiments. In each figure, hot water is supplied to the device via hot water supply line 410. Hot water supply line 410 is coupled to a hot water inlet 456 of manifold housing 430. The hot water flows into a plunger region 448 of manifold housing 430, where it comes in contact with plunger 442 of the anti-scald device. Plunger 442 incudes an o-ring 480 and a distal end o-ring 484. The position of plunger 442 is controlled by thermal actuator 440. In some embodiments, thermal actuator 440 is a wax element. The anti-scald device also includes bias spring 444. When the anti-scald device is in a closed position (i.e., due to sensing a mixed water temperature that reaches or exceeds a pre-set temperature), the hot water from hot water inlet 456 cannot pass through the plunger region 448 and to mixing cavity 414.

Bias spring 444 is positioned against an abutment surface 458 of plunger region 448, and provides a biasing force in the direction of Arrow U against thermal actuator 440 and plunger member 442, and against stop member 446. In some embodiments, stop member 446 can include a retaining ring to hold thermal actuator 440 in place. End cover 447 encloses the anti-scald cavity 462.

During operation of a faucet assembly comprising integrated anti-scald device 400, mixed water is configured to travel from the mixing cavity 414 to sensing region 460 of anti-scald cavity 462. The distal end 464 of the thermal actuator 440 is configured to expand along its central longitudinal axis as the temperature of the mixed water in the sensing region 460 increases.

In some embodiments, the pre-set temperature is 120° F. In this case, the anti-scald device will always be in an open position (even if thermal actuator 440 has expanded some, it has not expanded to the point at which distal end o-ring 484 of the anti-scald device comes in contact with an abutment surface of plunger region 448 such that the anti-scald device is in a closed position). In some embodiments, the pre-set temperature is 100-130° F. In some embodiments, the pre-set temperature is less than or equal to 130, 125, 120, 115, 110, or 105° F. In some embodiments, the pre-set temperature is greater than or equal to 100, 105, 110, 115, 120, or 125° F.

In some embodiments, the pre-set temperature is factory pre-set, and cannot be adjusted by a user.

In some embodiments, thermal actuator 440 comprises a wax element. The wax element may comprise for example, a paraffin wax. In some embodiments, thermal actuator 440 will start expanding once the mixed water temperature reaches 107.6° F. In some embodiments, once the mixed water temperature dips below 107.6° F., the thermal actuator 440 will start contracting and the plunger member 442 will be pushed back into an open position by bias spring 444, so the hot water orifice can be opened up again (i.e., the o-ring 484 is no longer in contact with an abutment surface of the plunger region 448) to allow more hot water pass through from the hot water inlet 456 to mixing cavity 414.

As explained above, at a user-selected temperature set point of the mixed water in the sensing region 460 (e.g., from about 100° F. to about 120° F.), the expansion of the thermal actuator 440 overcomes the bias force of spring 444, and the expansion of the distal end 464 of the thermal actuator 440 forces the plunger member 442 in the direction of Arrow D until the distal end o-ring 484 contacts the abutment surface 458 (e.g., cylindrical seating surface) of plunger region 448, thereby preventing hot water from moving from the hot water inlet 456 into the plunger region 448, and thus thereby preventing hot water from moving from the inlet 456 into the mixing cavity 414.

As such, the integrated anti-scald device/assembly within manifold housing 430 is configured to reduce or stop the inlet 456 flow of hot water in the event the mixed water temperature in sensing region 460 reaches or exceeds a user-selected set point temperature. When implemented, the exemplary anti-scald device/assembly 400 can prevent scalding as defined by ASSE 1070.

In some embodiments, when a mixing valve of a shaft portion releasably connected to a handle member is positioned in the full hot water position, there is also a cold water path open to the mixing cavity 414. As such, in the event that the hot temperature limit is reached and the hot water inlet flow is stopped by the anti-scald device/assembly as discussed above, the cold water may continue to flow to the thermal actuator 440 to cool and contract the thermal actuator 440 and allow it to reset (e.g., move the plunger back to an open position). Without such cold water flow to the thermal actuator 440, the thermal actuator 440 would, in a slower fashion, depend on the conductive cooling of its surroundings (e.g., the cooling of the manifold housing and water surrounding it) before the thermal actuator 440 could begin to operate again. And, even then and without such cold water flow to the actuator 440, the hot water immediately available to the thermal actuator 440 after such slower conductive cooling reset can, in a quicker fashion, cause the thermal actuator 440 to stop hot water flow again.

In some embodiments, the anti-scald device/assembly also includes stop member 446, which is configured to mount to manifold housing 430. The position of the stop member 446 results in the position of the thermal actuator 440. Further, stop member 446 is configured to stop the upward (direction U) motion of the thermal actuator 440 (e.g., caused by bias spring 444).

Manifold housing 430 also includes mixing cavity 414. In some embodiments, mixing cavity 414 is configured to house a mixing valve. The mixing valve is described in more detail below with respect to FIGS. 5 and 6 below.

Figure 5:
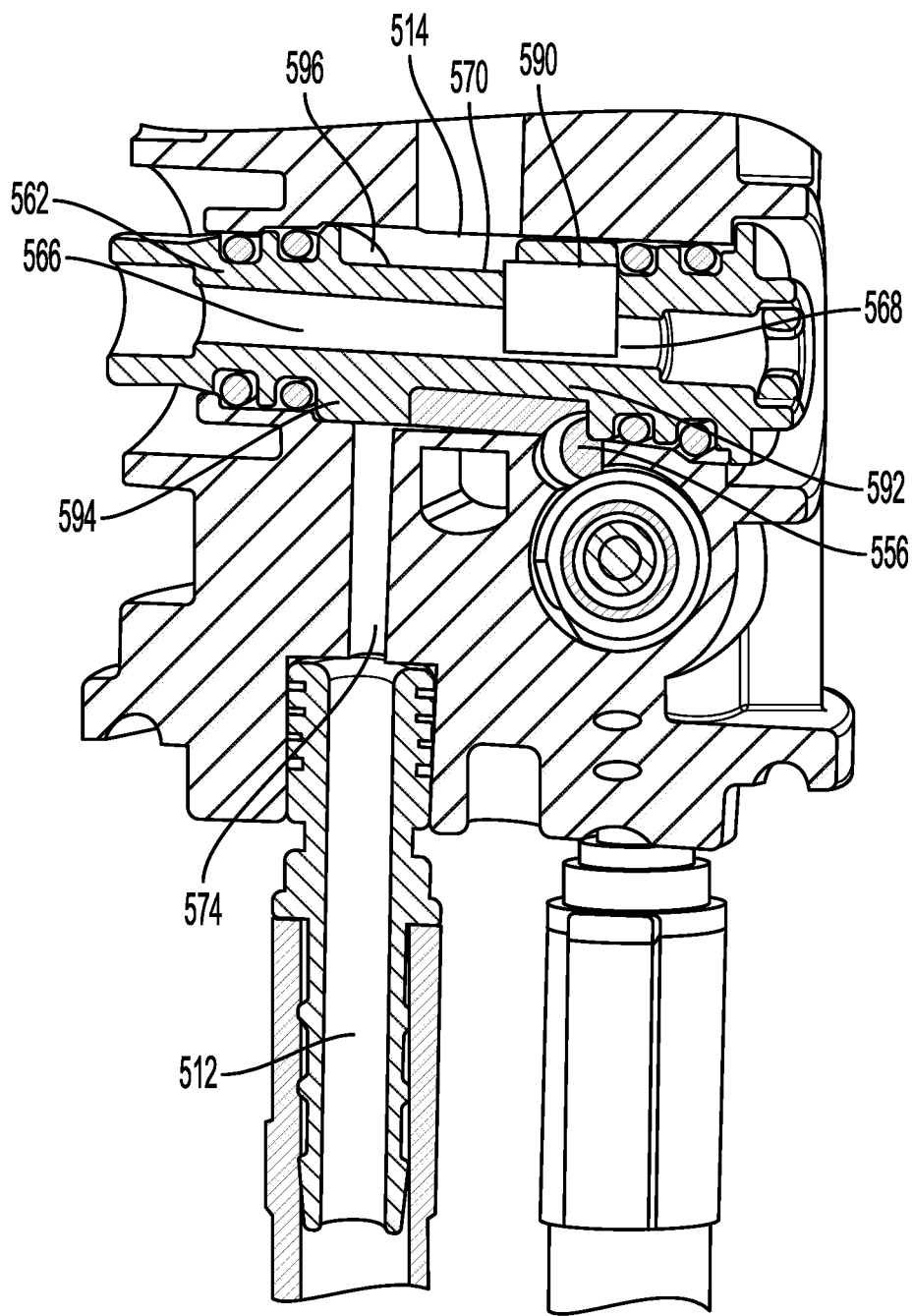
FIG. 5 shows a cross-sectional partial view of a manifold housing and mixing cavity, according to some embodiments.

FIG. 5 shows a cross-sectional view of a mixing cavity of a manifold housing according to some embodiments. As shown, flow of cold water from cold water supply line 512 and flow of hot water from hot water supply line is controlled by mixing valve 562. Mixing valve 562 is configured to couple to a handle member of a faucet assembly such that a user can control the amount of cold water relative to the amount of hot water that flows to mixing cavity 514. In other words, a user can use a handle member to control the relative temperature of the mixed water.

Figure 6:
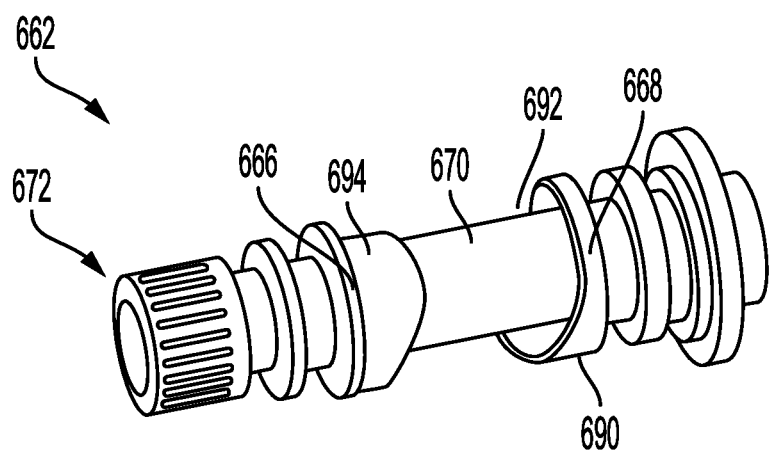
FIG. 6 shows a perspective view of a mixing valve shaft portion, according to some embodiments.

FIG. 6 shows a mixing valve 662 according to some embodiments.

As shown in FIG. 6, mixing valve 662 may be a coupled dual cam mixing valve. Mixing valve 662 is substantially cylindrical and includes a shaft portion 672, a cold water portion 666, a hot water portion 668, and a mixing portion 670 positioned between cold/hot portions 666, 668. Shaft portion 672 is configured to mount to a handle member of a faucet assembly.

Mixing valve 662 is configured to permit constant simultaneous adjustment of flows of both the hot and cold water inlets to mix to the desired outlet water temperature. As such, the flow rate of mixed water through the mixed water outlet can stay more constant (e.g., as the cold flow is increased through the cold water inlet, the hot flow is decreased through the hot water inlet; as the hot flow is increased through the hot water inlet, the cold flow is decreased through the cold water inlet). This is an improvement over conventional systems/methods of simply adjusting the cold water flow to control the outlet temperature. It is also an improvement over using and having to adjust two individual conventional flow control valves (e.g., an individual hot valve and an individual cold valve), as some embodiments of the present disclosure may advantageously use the one mixing valve 662 to control the flow of both hot and cold water flows through the hot water inlet and the cold water inlet, respectively.

Each of cold water portion 666 and hot water portion 668 is a cam portion, forming a dual cam mixing valve. Cold water portion 666 includes an elevated portion 694 and a recessed portion. Hot water portion 668 comprises an elevated portion 690 and a recessed portion 692.

Mixing valve 662 is configured such that, when it is in a full-cold position, the recessed portion of cold water portion 666 is proximate to the cold water inlet that is in fluid communication with the mixing cavity, and elevated portion is away from the cold water inlet that is in fluid communication with the mixing cavity. Further, when in a full-cold position, the elevated portion 690 of hot water portion 668 is proximate to the hot water inlet that is in fluid communication with the mixing cavity. The recessed portion 692 of hot water portion 668 is away from the hot water inlet that is in fluid communication with the mixing cavity.

Conversely, when mixing valve 662 is in a full-hot position, the recessed portion 692 of hot water portion 668 is proximate to the hot water inlet that is in fluid communication with the mixing cavity, and the elevated portion 690 is away from the hot water inlet. The elevated portion 694 of cold water portion 666 is proximate to the cold water inlet which is in fluid communication with the mixing cavity, and the recessed portion of the cold water portion 666 is away from the cold water inlet.

Thus, when in a full-hot position, the elevated portion 694 of cold water portion 666 is closer to the cold water inlet that is in fluid communication with the mixing cavity than when in a full-cold position. This allows more cold water to enter the mixing cavity when in a full-cold position than when in a full-hot position. However, even when mixing valve 662 is in a full-hot position, some cold water is still able to pass to the mixing cavity from the cold water inlet (e.g., the elevated portion 694 may not be flush with the cold water inlet opening to form a water tight seal which might otherwise completely restrict cold water from entering the mixing cavity). This limited stream of cold water that enters the mixing cavity even when the mixing valve 662 is in a full-hot position can help "reset" the thermal actuator of the anti-scald device as described previously.

Referring back to FIG. 5, cold water from supply line 512 is configured to enter cold water inlet 574. From cold water inlet 574, cold water can enter mixing cavity 514 through cold water portion 566 of mixing valve 562, and then travel to mixing portion 570 of mixing valve 562. FIG. 5 shows mixing valve 662 in a full-hot position, such that elevated portion 594 is proximate to cold water inlet 574. In a full-cold position, recessed portion 596 would be proximate to cold water inlet 574.

Thus, recessed portion 592 of hot water portion 568 is proximate to hot water inlet 556 since mixing valve 562 is in a full-hot position. When in a full-cold position, elevated portion 590 of hot water portion 568 would be proximate to hot water inlet 556.

Mixing valve 562 may be positioned in a full-cold position, a full-hot position, or in any position between a full-hot and a full-cold position. Thus, the elevated portion 594 of cold portion 566 may be adjacent (and proximate) to cold water inlet 574 (as shown in FIG. 5), it may be entirely opposite cold water inlet 574, or it may be somewhere in between. Similarly, the elevated portion 590 of hot water portion 568 may be adjacent (and proximate) to hot water inlet 556, it may be entirely opposite hot water inlet 556 (as shown in FIG. 5), or it may be somewhere in between.

As shown in FIG. 5, mixing valve 562 is positioned such that little to no cold water can enter mixing portion 570. Instead, an elevated portion 594 of cold water portion is positioned over the opening through which cold water could travel from cold water inlet 574 to mixing portion 570. However, the mixing valve 562 is positioned such that hot water is allowed to flow from a hot water inlet to mixing portion 570 of mixing valve 562 via a plunger region (proximate to the anti-scald device). In some embodiments, mixing valve 562 is mounted to a handle member, which is configured to allow a user to control the amount of cold water relative to the amount of hot water that enters the mixing portion 570.

Figure 7:
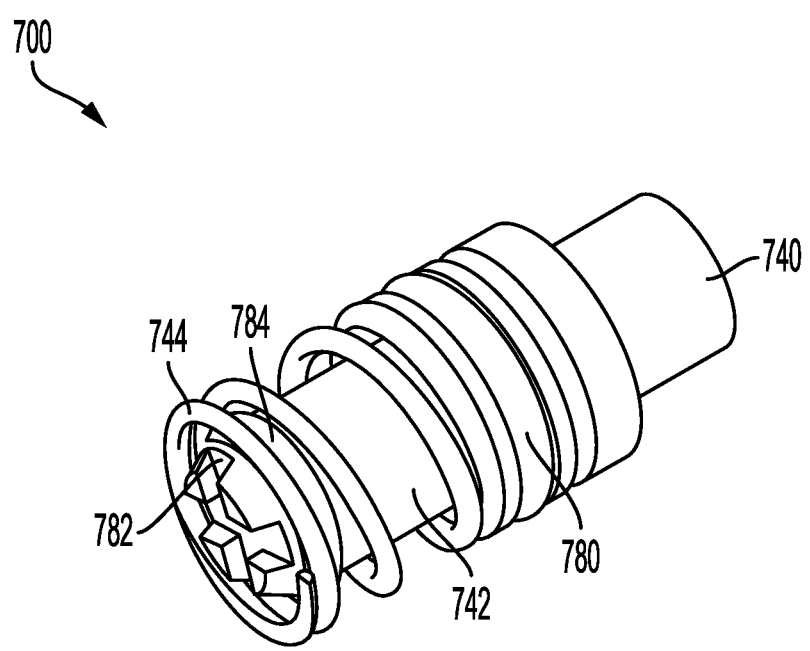
FIG. 7 shows an anti-scald device for an anti-scald cavity of a manifold housing, according to some embodiments.

FIG. 7 shows an anti-scald insert 700 for an integrated anti-scald device of a faucet assembly. Insert 700 includes thermal actuator 740, plunger 742, bias spring 744, an o-ring 780 and a distal end o-ring 784.

As explained above, when insert 700 is positioned within an anti-scald cavity of a manifold housing, bias spring 744 holds the anti-scald device open such that hot water can travel from a hot water inlet, through a plunger region (surrounding the bias spring 744 and plunger 742) and to a mixing cavity where the hot water mixes with cold water. After mixing, the mixed water flows to a sensing region where the mixed water comes in contact with the thermal actuator 740. In some embodiments, thermal actuator 740 is configured to expand as the temperature of the mixed water increases. The anti-scald device can be configured such that, when the mixed water temperature reaches or exceeds a predetermined set point temperature, the thermal actuator 740 expands to the point at which a distal end 782 of plunger 742 and/or a distal end o-ring 784 contacts and sits against an abutment surface of the anti-scald cavity in the manifold housing. In some embodiments, a circumferential edge of distal end 782 and/or a distal end o-ring 784 comes in contact with the abutment surface. This contact specifically between the distal end o-ring 784 and the abutment surface prevents hot water from flowing into the mixing cavity. However, cold water will still be able to enter the mixing cavity (and in some embodiments, even when the mixing valve is configured to a maximum hot water position). Thus, the cold water entering the mixing cavity will flow to the thermal actuator 740, causing the thermal actuator to contract and pull the plunger 742 back into an open position to allow hot water to again flow into the device. Thus "reset" or "cooling" mechanism allows the thermal actuator 740 to reset more quickly than it would otherwise be able to (i.e., without having cold water running to the sensing region and coming into contact with the thermal actuator 740. This minimizes the amount of downtime once the anti-scald device is activated (i.e., cuts off hot water flow due to the mixed water temperature reaching or exceeding the pre-set water temperature) such that a user can again use hot water to achieve a desired water temperature. One or more o-rings 780 may be included to ensure a watertight seal in the anti-scald cavity. In some embodiments, plunger 742 may comprise brass material. In some embodiment, distal end 782 may comprise a brass material. In some embodiments, thermal actuator 740 comprises one or more of copper tubing (casing), stainless steel (pin), and a wax element.

FIGS. 8A-8G show various cross-sectional views of an integrated manifold housing with anti-scald device, according to some embodiments.

As shown, the integrated manifold housing with anti-scald device includes an anti-scalding cavity housing an anti-scalding device that includes thermal actuator 840 and plunger 864. The thermal actuator 840 and plunger 864 are held in place between a stop member 846 and a bias spring. Hot water supply line 810 is fluidly coupled to hot water inlet 856. The hot water can flow from hot water inlet 856 through plunger region 848 and to a mixing cavity. Actuating member 816 can control the flow of water from the mixing cavity 814 to a sensing region 860, and out of a mixed water outlet to a user (by way of adaptor 832).

In some embodiments, a height of the anti-scald cavity as measured along its longitudinal axis and between stop member 846 and the bottom of the anti-scald cavity (i.e., at the abutment surface) is 10-25 mm. In some embodiments, a height of the anti-scald cavity as measured along its longitudinal axis is less than or equal to 25, 24, 23, 22, 21, 20, 19, 18, 17, 16, 15, 14, 13, 12, or 11 mm. In some embodiments, a height of the anti-scald cavity as measured along its longitudinal axis is greater than or equal to 10, 11, 12, 13, 14, 15, 16, 17, 18, 19, 20, 21, 22, 23, or 24 mm. In some embodiments, a volume of the anti-scald cavity is 1000-2500 mm$^2$. In some embodiments, the volume of the anti-scald cavity is less than or equal to 2500, 2000, or 1500 mm$^2$. In some embodiments, the volume of the anti-scald cavity is greater than or equal to 1000, 1500, or 2000 mm$^2$.

Mixing cavity 814 is configured to house a mixing valve. The mixing valve can be a dual cam valve comprising a cold water portion 866 and a hot water portion 868, as described in detail above. Each of the cold water portion 866 and the hot water portion 868 comprises an elevated portion and a recessed portion. The position of the elevated portion and the recessed portion of each of the hot water portion 868 and the cold water portion 866 controls how much hot water and cold water, respectively, flowing into mixing cavity 814. Specifically, cold water portion 866 comprises elevated portion 894 and recessed portion 896, and hot water portion 868 comprises elevated portion 890 and recessed portion 892.

In some embodiments, mixing cavity 814 has a volume 1000-3000 mm$^2$. In some embodiments, the volume of mixing cavity 814 is less than or equal to 3000, 2500, 2000, or 1500 mm$^2$. In some embodiments, the volume of mixing cavity is greater than or equal to 1000, 1500, 2000, or 2500 mm$^2$.

Cold water supply line 812 is fluidly coupled to cold water inlet 874. Cold water flows from cold water supply line 812, to cold water inlet 874, and into mixing cavity 814.

Figure 8C:
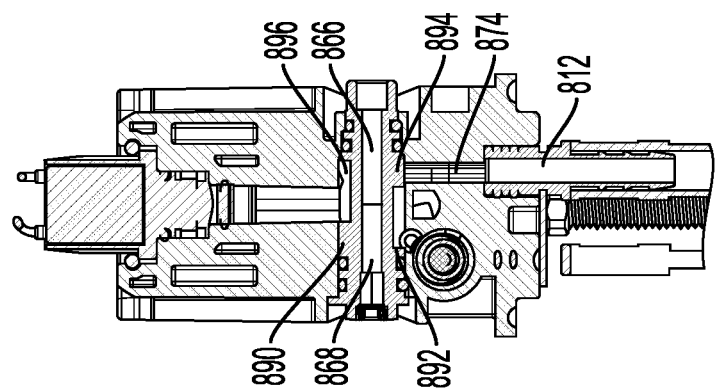
FIGS. 8A-8G show various cross-sectional views of a manifold housing having an integrated anti-scald device, according to some embodiments.
Figure 8B:
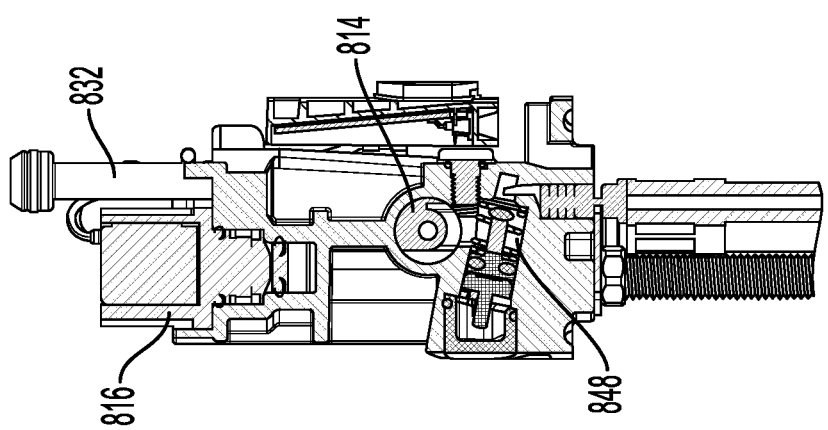
Figure 8A:
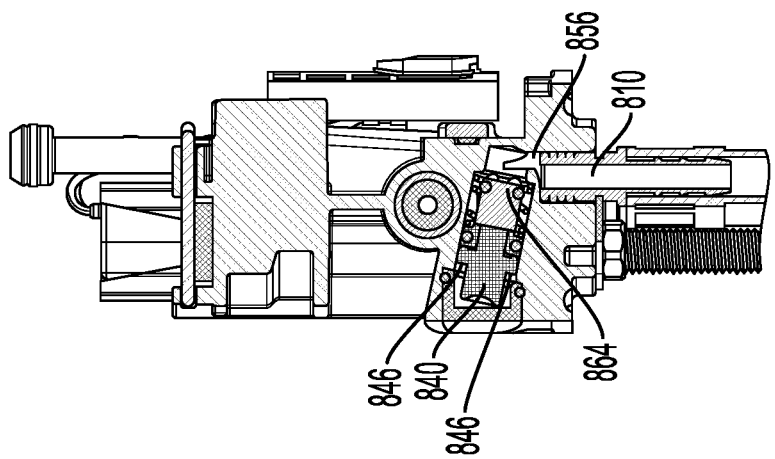
Figure 8G:
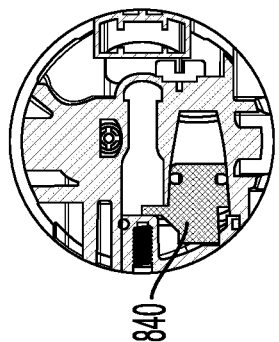
Figure 8F:
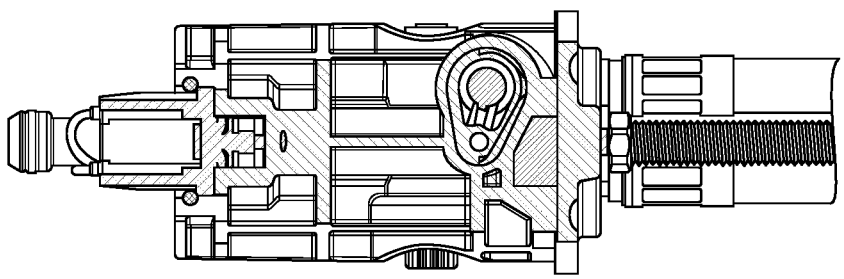
Figure 8E:
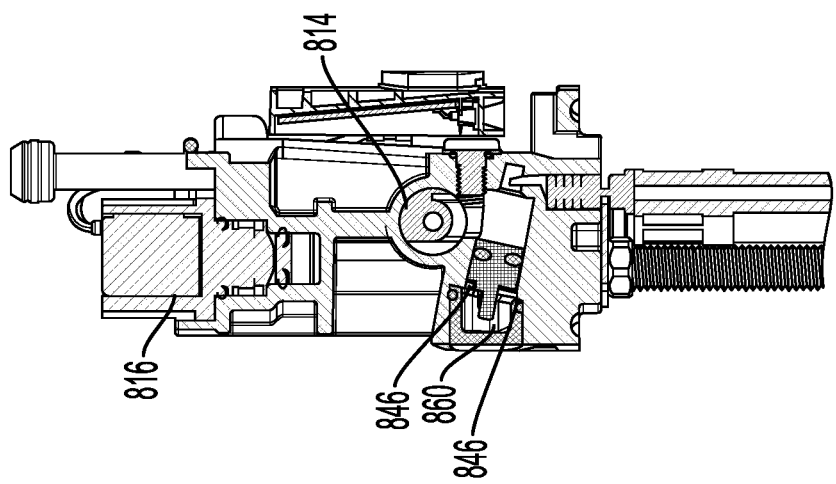
Figure 8D:
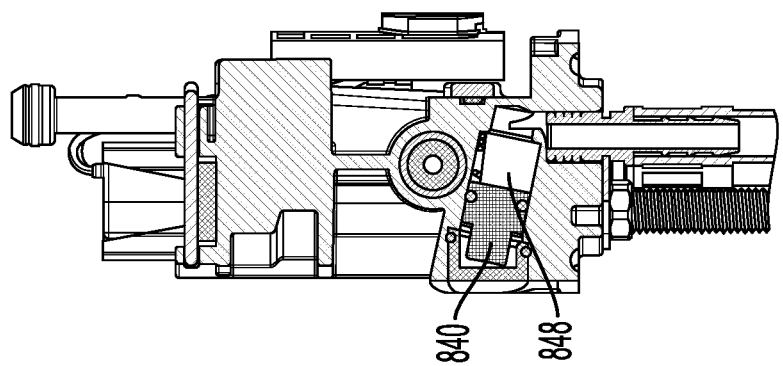

As shown clearly in FIG. 8D, a longitudinal axis of the anti-scald cavity (that houses the anti-scald device comprising plunger 848 and thermal actuator 840) is at an angle to the longitudinal axis of actuating member 816 and the actuating cavity in which actuating member 816 is housed. In some embodiments, actuating member 816 is vertical such that the longitudinal axis of actuating member 816 and the actuating cavity in which actuating member 816 is housed is vertical. In some embodiments, the angle between the longitudinal axis of the anti-scald cavity and the actuating cavity is between 5 and 85 or between 30 and 60 degrees. In some embodiments, the angle between the longitudinal axis of the anti-scald cavity and the actuating cavity is less than or equal to 85, 80, 70, 60, 50, 40, 30, 20, or 10 degrees. In some embodiments, the angle between the longitudinal axis of the anti-scald cavity and the actuating cavity is greater than or equal to 5, 10, 20, 30, 40, 0, 60, 70, or 80 degrees. The angle of the anti-scald cavity can help minimize the overall dimensions of the manifold. Thus, a manifold having an angled anti-scald cavity can be used with a greater variety of faucets, including faucets of different sizes, shapes, and designs. Manifolds having vertical or horizontal anti-scald cavities necessarily require larger dimensions to accommodate the anti-scald cavity. Because the overall dimensions of these manifolds are greater, they cannot be used with the same variety of faucets. Specifically, the larger manifolds are limited to being used with larger faucets.

In some embodiments, the volume of actuating cavity may be 500-5000 mm$^2$. In some embodiments, the volume of actuating cavity may be less than or equal to 5000, 4500, 4000, 3500, 3000, 2500, 2000, 1500, or 1000 mm$^2$. In some embodiments, the volume of actuating cavity may be greater than or equal to 500, 1000, 1500, 2000, 2500, 3000, 3500, 4000, or 4500 mm$^2$.

In some embodiments, the flow path between actuating member 816 and sensing region 860 is relatively short, allowing the anti-scald device to react more quickly to a mixed water temperature the reaches or exceeds the pre-set temperature. In some embodiments, the flow path between actuating member 816 and sensing region 860 may be 10-50 mm. In some embodiments, the flow path between actuating member 816 and sensing region 860 may be less than or equal to 50, 40, 30, or 20 mm. In some embodiments, the flow path between actuating member 816 and sensing region 860 may be greater than or equal to 10, 20, 30, or 40 mm. In some embodiments, the length of the flow path is shorter due to the angled position of the anti-scald cavity. Thus, the flow path is longer in integrated anti-scald devices that have a vertical or horizontal anti-scald cavity, and therefore the anti-scald mechanism is not as reactive due to the longer flow path.

In some embodiments, a portion of the actuating member 816 is above a portion of the anti-scald cavity. In some embodiments, a portion of mixing cavity 814 is above a portion of the anti-scald cavity.

In some embodiments, the longitudinal axis of the anti-scald cavity runs at an angle to the longitudinal axis of the hot and cold water supply lines. In some embodiments, the longitudinal axis of the hot and cold water supply lines is vertical. In some embodiments, the angle between the longitudinal axis of the anti-scald cavity and the longitudinal axes of each of the hot and cold water supplies (which are parallel to each other) is between 5 and 85 or between 30 and 60 degrees. In some embodiments, this angle is less than or equal to 85, 80, 70, 60, 50, 40, 30, 20, or 10 degrees. In some embodiments, this angle is greater than or equal to 5, 10, 20, 30, 40, 50, 60, 70, or 80 degrees. In some embodiments, the angled configuration of the anti-scald cavity helps to form an overall smaller manifold with integrated anti-scald device. If the anti-scald cavity is vertical in the manifold, then the entire device (with manifold) would need to be greater in height to accommodate the vertical anti-scald cavity. If the anti-scald cavity is horizontal, then the entire device (with manifold) would have to be wider to accommodate the horizontal anti-scald cavity. Accordingly, an angled anti-scald cavity allows for the overall dimensions (height and width) of the manifold with integrated anti-scald device to be minimized. This allows the manifold with integrated anti-scald device to be used in a wider variety of faucet shapes, sizes, and designs.

In some embodiments, the total volume of a manifold having an integrated anti-scald device according to embodiments herein can be 25-50 cm$^3$. In some embodiments, the total volume of a manifold having an integrated anti-scald device according to embodiments herein can be less than or equal to 50, 45, 40, 35, or 30 cm$^3$. In some embodiments, the total volume of a manifold having an integrated anti-scald device according to embodiments herein can be greater than or equal to 25, 30, 35, or 45 cm$^3$. In some embodiments, the total volume of a manifold having an angled integrated anti-scald device is less than the total volume of a manifold having a vertical or horizontal anti-scald device. This means that the described manifold having an integrated anti-scald device can be used in a larger variety of faucets. Specifically, since the overall dimensions are smaller, this means that the manifold having an integrated anti-scald cavity can be used in faucets having smaller dimensions and/or more restrictive shapes or designs than larger manifolds.

Figure 9:
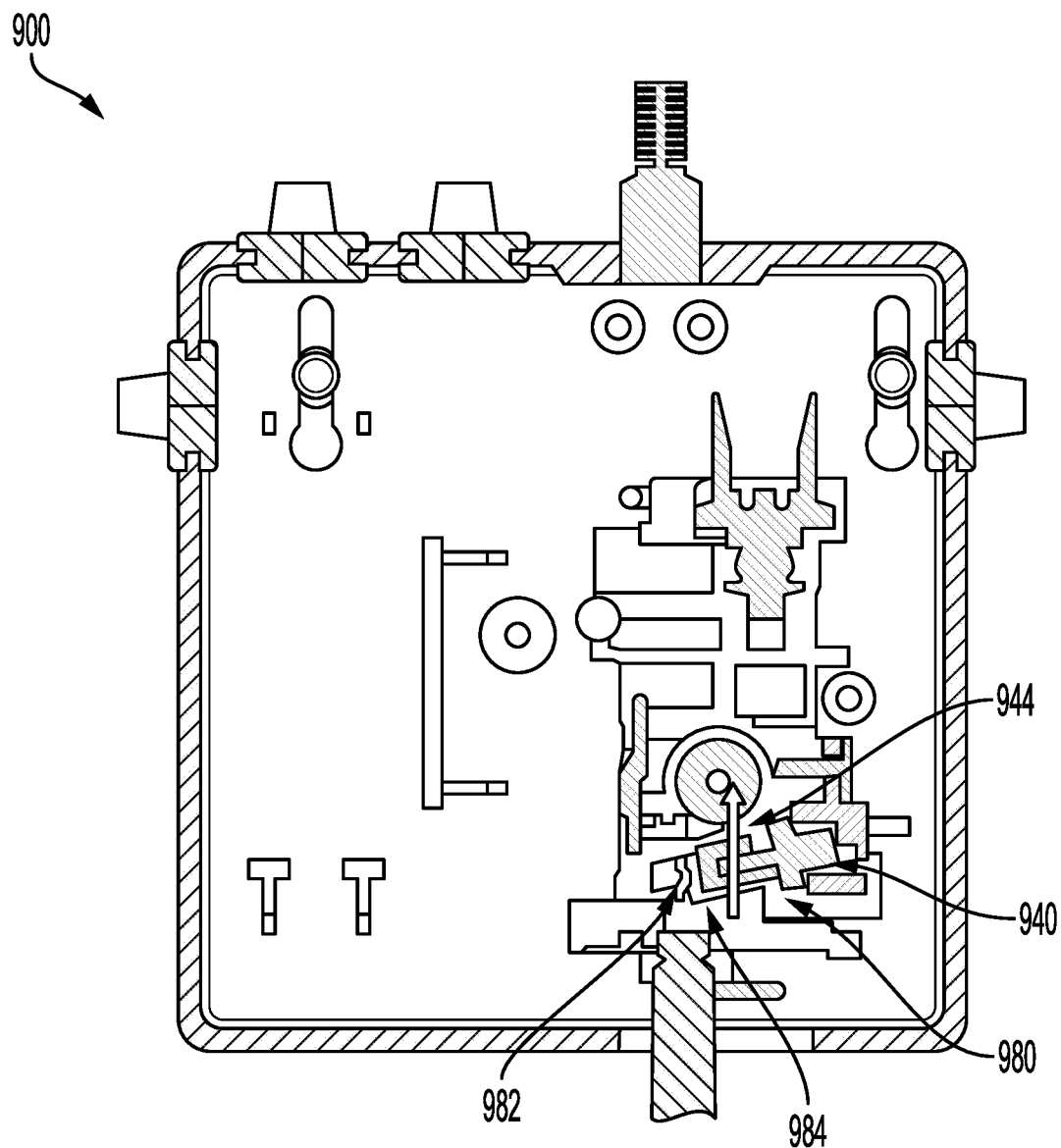
FIG. 9 shows a control box configured to be mounted below deck of a faucet assembly and house one or more of an anti-scald device or a mixing valve, according to some embodiments.

FIG. 9 shows a control box 900 configured to be mounted below deck of a faucet assembly and house a manifold and one or more of an anti-scald device or a mixing valve, according to some embodiments. In some embodiments, the manifold may comprise the anti-scald device. Specifically, control box 900 may include a thermal actuator 940, a bias spring 944, an o-ring 980 and a distal end o-ring 984, and a distal end 982 of the piston/thermal actuator 940. In some embodiments, these components may include one or more features described with respect to any one or more of FIG. 2-8G. In embodiments utilizing a control box 900 such as that depicted in FIG. 9, the control box 900 may house an anti-scald device, as shown in FIG. 9. The mixing valve may be located elsewhere below deck, or the mixing valve may be located within a faucet housing. In some embodiments, control box 900 may house the mixing valve of the faucet assembly, and the anti-scald device may be located elsewhere below deck or within the faucet housing of the faucet assembly. In some embodiments, control box 900 may house both the mixing valve and the anti-scald device of the faucet assembly. In some embodiments, control box 900 housing anti-scald device and/or a mixing valve may be used with an automatic hands-free faucet assembly.

In some embodiments, a below deck control box (such as control box 900) may comprise a manifold, such as a polymeric manifold. In some embodiments, a below deck control box may comprise a manifold and a solenoid (e.g., solenoid valve).

Figure 10:
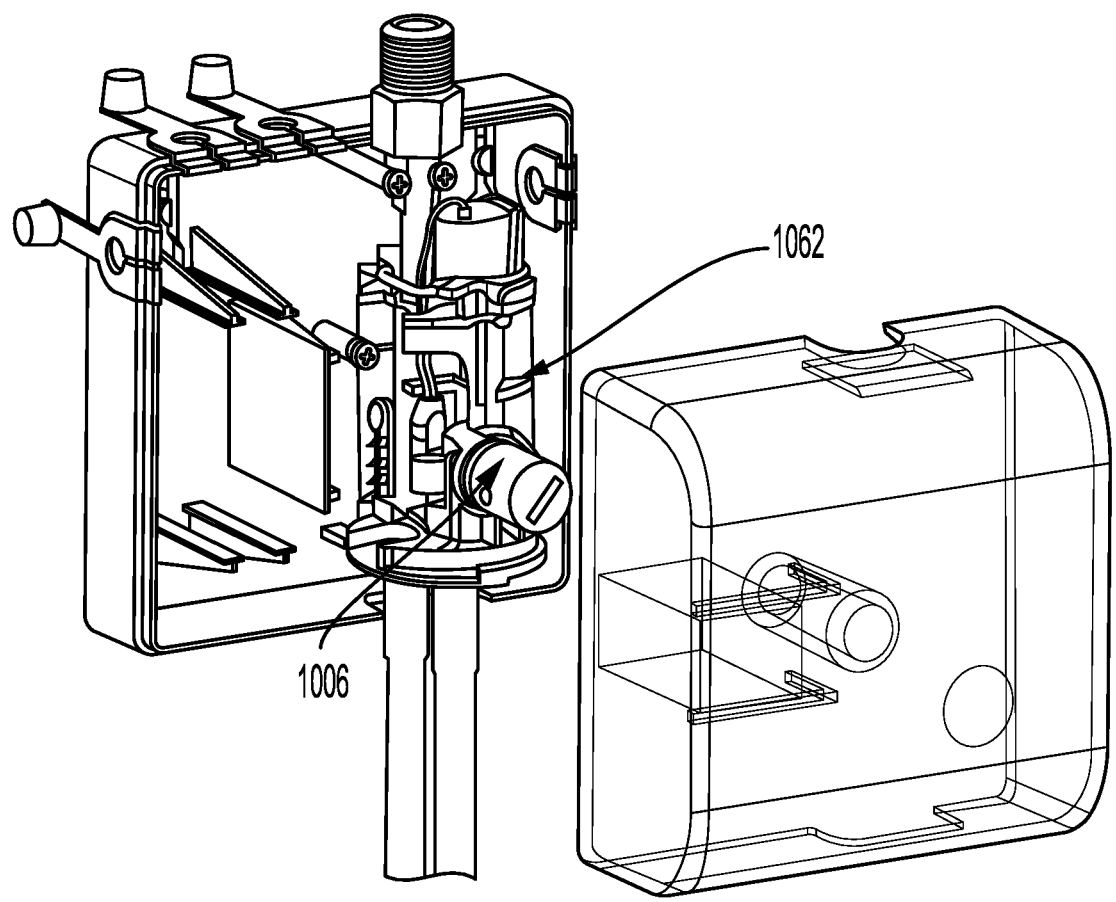
FIG. 10 shows a control box according to some embodiments.

FIG. 10 shows a control box 1000 according to some embodiments. As shown, control box includes a manifold comprising a mixing valve 1062 and a handle member 1006. In some embodiments, control box 1000 may be housed underneath a deck top and/or may be utilized with an automatic or hands-free faucet assembly.

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

The invention claimed is:

1. An anti-scald assembly for a faucet housing comprising:
   a polymeric manifold housing comprising an anti-scald cavity, a mixing cavity, a hot water inlet, a cold water inlet, a mixed water outlet, and an actuator cavity housing a valve;
   an anti-scald device housed within the anti-scald cavity of the polymeric manifold housing, the anti-scald device comprising a thermal actuator coupled to a plunger, wherein the thermal actuator and the plunger are held in an open position within the anti-scald cavity with a bias spring,
   wherein, when the valve is actuated, mixed water from the mixing cavity is configured to flow to a sensing region of the anti-scald cavity and to the mixed water outlet, the mixed water being formed by cold water that is configured to flow from the cold water inlet to the mixing cavity and hot water that is configured to flow from the hot water inlet to the mixing cavity,
   wherein, when a temperature of the mixed water reaches or exceeds a pre-set temperature in the sensing region of the anti-scald cavity, the thermal actuator is configured to expand such that the thermal actuator moves the plunger of the anti-scald device along a longitudinal axis of the anti-scald cavity to a closed position to close off the hot water inlet, and
   wherein the longitudinal axis of the anti-scald cavity is at an angle from 10 to 85 degrees relative to a longitudinal axis of the actuator cavity.

2. The assembly of claim 1, wherein the longitudinal axis of the actuator cavity runs parallel to a longitudinal axis of at least one of the hot water inlet or the cold water inlet.

3. The assembly of claim 1, wherein the longitudinal axis of the actuator cavity is parallel to a direction at which cold water enters the cold water inlet from a cold water supply and to a direction at which hot water enters the hot water inlet from a hot water supply.

4. The assembly of claim 1, wherein a portion of the anti-scald cavity is aligned with a portion of the mixing cavity.

5. The assembly of claim 1, wherein the polymeric manifold housing comprises one or more of a polyphthalamide, a polyamide, a polyester, a polyolefin, a polycarbonate, a polyphenylene sulfide, a polyoxymethylene, or a polystyrene.

6. The assembly of claim 1, wherein the thermal actuator comprises a wax element.

7. The assembly of claim 1, wherein the plunger surrounds a distal end of the thermal actuator.

8. The assembly of claim 1, wherein the mixing cavity houses a mixing valve.

9. The assembly of claim 8, wherein the mixing valve is a dual-cam mixing valve comprising a cold water portion and a hot water portion, the hot water portion comprising a first recessed end and a first elevated end and the cold water portion comprising a second recessed end and a second elevated end.

10. The assembly of claim 9, wherein the dual-cam mixing valve is configured to be movable between a full-cold position and a full-hot position to simultaneously adjust flow of both the hot water and the cold water into the mixing cavity.

11. The assembly of claim 10, wherein the dual-cam mixing valve is configured such that, when the dual-cam mixing valve is in the full-cold position, the second elevated end is positioned a first distance from an end of the cold water inlet such that a first amount of cold water flows into the mixing cavity.

12. The assembly of claim 11, wherein the dual-cam mixing valve is configured such that, when the dual-cam mixing valve is in the full-hot position, the second elevated end is positioned a second distance, less than the first distance, from the end of the cold water inlet such that a second amount of cold water, less than the first amount, flows into the mixing cavity.

13. The assembly of claim 1, wherein the hot water inlet is fluidly connected to the mixing cavity and the cold water inlet is fluidly connected to the mixing cavity, and wherein the mixing cavity is fluidly connected to a sensing region of the anti-scald cavity such that a mixed water flow formed from hot water and cold water travels through the sensing region of the anti-scald cavity and then out the mixed water outlet.

14. The assembly of claim 1, wherein the thermal actuator is configured such that, after the hot water inlet is closed by the plunger, cold water continues to flow to the sensing region.

15. The assembly of claim 1, wherein, when the anti-scald assembly is installed in a faucet housing, a sensor of the faucet housing is configured to control the actuator.

16. The assembly of claim 15, wherein the sensor comprises an infrared sensor, a proximity sensor, a capacitive sensor, a microwave sensor, or an ultrasonic sensor.

17. The assembly of claim 1, wherein the anti-scald assembly is located within a faucet housing.

18. The assembly of claim 1, wherein the anti-scald assembly is located below deck of a faucet housing.

19. A fluid supply assembly comprising:
  a faucet housing comprising a spout opening, a base adaptor, and an outlet conduit;
  a polymeric manifold housing housed within the faucet housing and mounted to the base adaptor of the faucet housing, the polymeric manifold housing comprising an anti-scald cavity, a mixing cavity, a hot water inlet, a cold water inlet, a mixed water outlet, and an actuator cavity housing a valve, wherein a longitudinal axis of the anti-scald cavity is at an angle from about 5 to about 85 degrees relative to a longitudinal axis of the actuator cavity;
  an anti-scald device housed within the anti-scald cavity of the polymeric manifold housing, the anti-scald device comprising a thermal actuator coupled to a plunger, wherein the thermal actuator and the plunger are held in an open position within the anti-scald cavity with a bias spring,
  wherein, when the valve is actuated, mixed water from the mixing cavity is configured to flow to a sensing region of the anti-scald cavity and to the mixed water outlet, the mixed water being formed by cold water that is configured to flow from the cold water inlet to the mixing cavity and hot water that is configured to flow from the hot water inlet to the mixing cavity,
  wherein, when a temperature of the mixed water reaches or exceeds a pre-set temperature in the sensing region of the anti-scald cavity, the thermal actuator is configured to expand such that the thermal actuator moves the plunger of the anti-scald device along the longitudinal axis of the anti-scald cavity to a closed position to close off the hot water inlet, and
  wherein the longitudinal axis of the anti-scald cavity is at an angle from 10 to 85 degrees relative to a longitudinal axis of the actuator cavity.

* * * * *